H. VISSERING.
TRACK SANDER.
APPLICATION FILED OCT. 30, 1907.

943,288.

Patented Dec. 14, 1909.
7 SHEETS—SHEET 1.

H. VISSERING.
TRACK SANDER.
APPLICATION FILED OCT. 30, 1907.

943,288.

Patented Dec. 14, 1909.
7 SHEETS—SHEET 6.

H. VISSERING.
TRACK SANDER.
APPLICATION FILED OCT. 30, 1907.

943,288.

Patented Dec. 14, 1909.
7 SHEETS—SHEET 7.

Witnesses:
Harvey L. Lechner
Archworth Martin

Inventor,
Harry Vissering
By his Attys,
Synnestvedt & Carpenter

UNITED STATES PATENT OFFICE.

HARRY VISSERING, OF CHICAGO, ILLINOIS.

TRACK-SANDER.

943,288.

Specification of Letters Patent.   Patented Dec. 14, 1909.

Application filed October 30, 1907.   Serial No. 399,863.

*To all whom it may concern:*

Be it known that I, HARRY VISSERING, a citizen of the United States, residing at Chicago, in the county of Cook and State of Illinois, have invented certain new and useful Improvements in Track-Sanders, of which the following is a specification.

This invention relates to devices for applying sand at the point of contact between the driver wheels of a locomotive, or other self-propelling motor, and the rails of the track on which it runs in order to enable such driver wheels to secure good traction of adhesion, especially on grades and where the rails are wet or slippery. It relates especially to that type of sanders wherein fluid pressure is used to cause and govern the ejection of sand within the limits determined by the user, as contradistinguished from the gravity types which are not thus responsive to the same degree.

The objects of the invention are to provide a sander that will be economical, efficient and durable in operation, cheaply conveniently and easily built and installed, and one not likely to get out of order and require frequent attention and repair to maintain in an operative condition. To provide a sander wherein the high pressure expansive and expulsive force of steam may be used successfully in lieu of compressed air of about one-third the pressure, in order to insure greater rapidity and reliability of operation. To provide a sander that will use a minimum amount of air in order to relieve the air compressor of as much drain of pressure as possible, and to use the direct pressure and power of steam from the boiler as far as possible instead of the indirect power of such steam in the form of compressed air. To provide a novel arrangement of parts, whereby steam can be used in a sander at high altitudes and latitudes and at all times of the year.

It has been proposed heretofore to use steam exclusively in a sander, but not the combination of steam and compressed air as hereinafter described. The steam sanders heretofore used have not been successful in practice under all conditions for owing to condensation, ensuing from such use of steam, water forms in the smaller passages and either wets and packs or freezes any sand present, making it immovable and unresponsive to the pressure or heat of the steam, or else freezes the condensed vapor in the nozzle, the air in the piping forming a cushion which will prevent throwing of the frozen matter and blocking the egress of the sand to the rails when the steam pressure is applied.

Referring to the drawings, Figure 12 is a plan of Figure 13 illustrating the ejector.

Figures 1, 13:
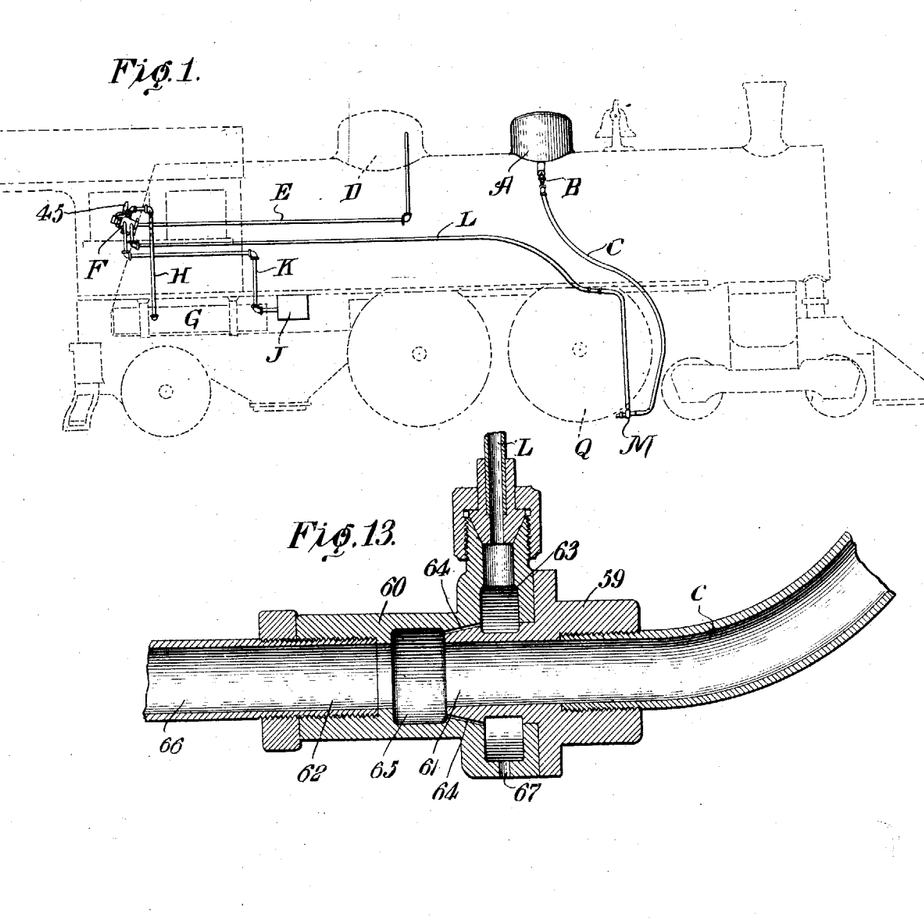
Figure 1 is an elevation of a locomotive engine having my invention applied thereto.
Figure 13 is a section taken longitudinally through the line XIII of Figure 12, Figures 14, 15, 16 and 17 illustrate modifications of the sand trap, Figure 17 being a section on the line XVII of Figure 16.
Figure 2:
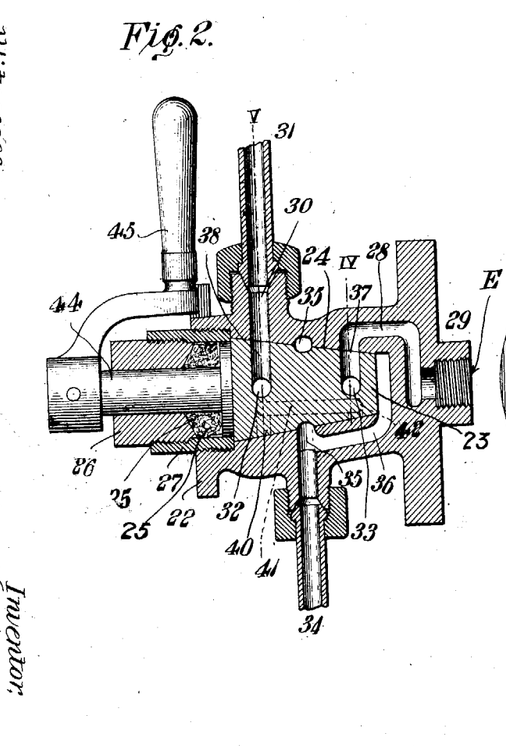
Figure 2 is a section of the controlling valve of the present invention taken on the line II—II of Figure 3.

In carrying out my improvement in its preferred form, I provide, referring to Figure 1, the usual dome A, containing sand and mounted on the engine boiler R, and a trap, B, which is connected thereto, and has a pipe C, on each side of the locomotive (one not shown) for carrying the sand to the rail. The steam dome has a pipe E carrying live steam therefrom to the controlling valve F conveniently mounted in the engine cab. The main compressed air reservoir G of the air brake system has a pipe H leading to the said valve F. A small storage or supply auxiliary reservoir J having a pipe K leading therefrom to the valve F, is provided and fed while the steam is being used, and afterward put into communication with the ejector pipe to blow the steam out thus materially economizing in the air since the only amount of air used is the small pocketed amount stored in the reservoir J, which thus saves a great deal of waste. A pipe L (having branches on each side of the locomotive, not shown) leading from the valve F to the ejector M (mounted adjacent the driver wheel Q) which may be of various different types of construction but which in my preferred form is more fully illustrated in Figure 13 and which receives sand from the pipe C.

Figures 3, 4, 5:
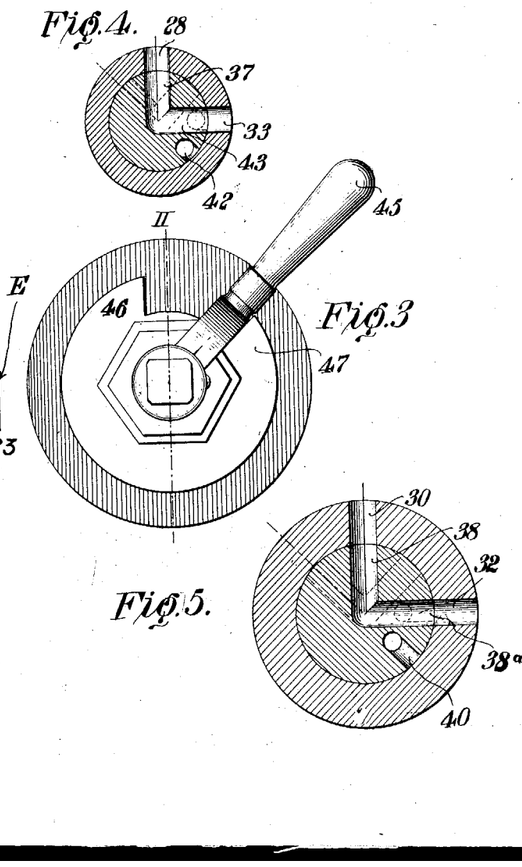
Figure 3 is a plan view of the handle of the valve and the stops thereon.
Figures 4 and 5 are details of such valve taken on lines IV and V of Figure 2, to illustrate the arrangement of ports and passages in the valve.

Referring to Figures 2, 3, 4 and 5, 22 is the casing of a valve F (see Figure 1) wherein 23 is a tapered plug or stem adapted to contact with the casing 22 and provided with packing 25 held in place by the gland 26 threaded into the sleeve 27 which holds the plug in contact with the casing. The casing 22 is provided with a passage 28 leading to a connection 29 to the line E, a passage 30 leading to a connection 31 to the main reservoir pipe H, a passage 32 leading to a connection to the auxiliary reservoir pipe K, (see Figure 5) a passage 33 leading to the ejector pipe L, and a leakage vent to the atmosphere (34) surrounding the plug 23 by a passage 35 and extending below the plug as indicated at 36 in order that any leakage of steam from the passage 28 may escape to the atmosphere. The plug 23 is provided with passages 37 and 43 registering with the passages 28 and 33 and with passages 38 and 38ᵃ registering with the passages 30 and 32 when the valve is in its open position shown by the location of the handle in Figure 3. The plug 23 is further provided with a by-pass consisting of the passages 40 and 42 connected by a passage 41, and registering respectively with the passages 32 and 33 when the valve is in its closed position. The plug 23 is further provided with a stem 44 having a handle 45 for rotation of the plug within the limits of the stops 46 and 47 on the casing 22 formed by cutting away the top of such casing as shown in Figure 3.

Figures 6, 7, 8:
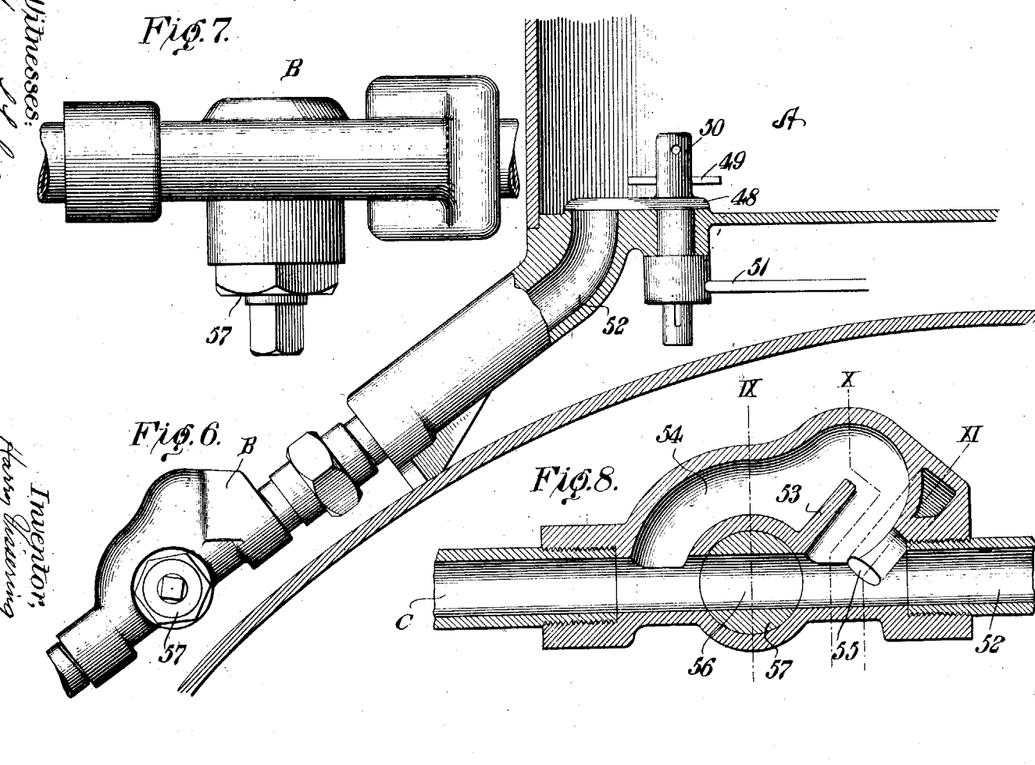
Figure 6 is a view partly in section of the sand trap of the present invention.
Figure 7 is a bottom plan view of the trap.
Figure 8 is a vertical section, taken longitudinally on Figure 6, Figures 9, 10 and 11 are sections taken on lines IX, X and XI of Figure 8 to show the arrangement of ports and passages in the trap.

Referring now to Figures 6, 7 and 8, I provide a sand carrying dome or box A having a valve 48, mounted on the valve stem 50 (governed by the lever 51) which carries a cross piece or agitator 49. Adjacent the sand dome A, I provide a passage 52 leading to a trap and controlling device B, wherein (referring more particularly to Figure 8) 53 is an abutment for restraining the sand descending from the dome from further flow through the passage 52 or the chamber 54, leading into a continuation of the chamber 52. 56 is a passage in a plug valve 57 by means of which direct communication between the passage 52 and the pipe C may be established when it is desired to operate the sander manually as a gravity device. 55 is a passage in the trap B communicating with the atmosphere by a port 58 (Figure 11) for a purpose to be hereinafter described.

Figures 9, 10, 11, 12:
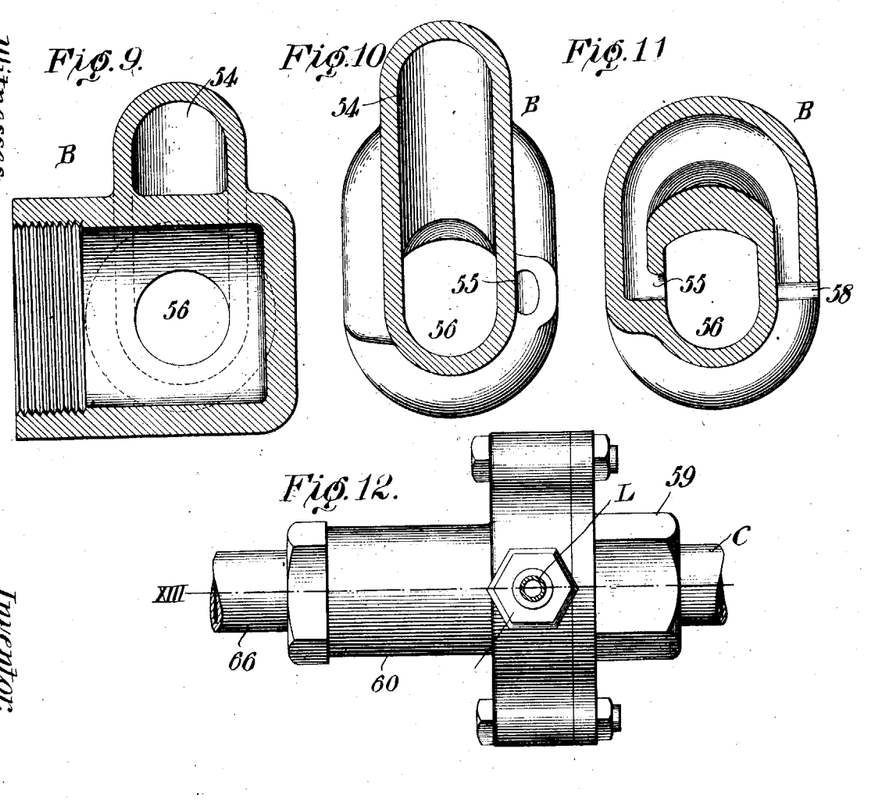

Referring to Figures 12 and 13 illustrating the ejector, it will be seen that I provide a pair of coöperating parts 59 and 60, which are bolted together when assembled and are provided with connecting passages 61 and 62. The part 59 has threaded connection with the pipe C. The part 60 carries the ejector pipe L and is provided with an annular chamber 63 from which leads a circumferential passage 64 leading to the chamber 65. At the outer end of the part 60 there is provided the ejector nozzle 66 for the sand. At 67 is provided an exhaust port which may be closed by a plug—if desired.

Figures 14, 15:
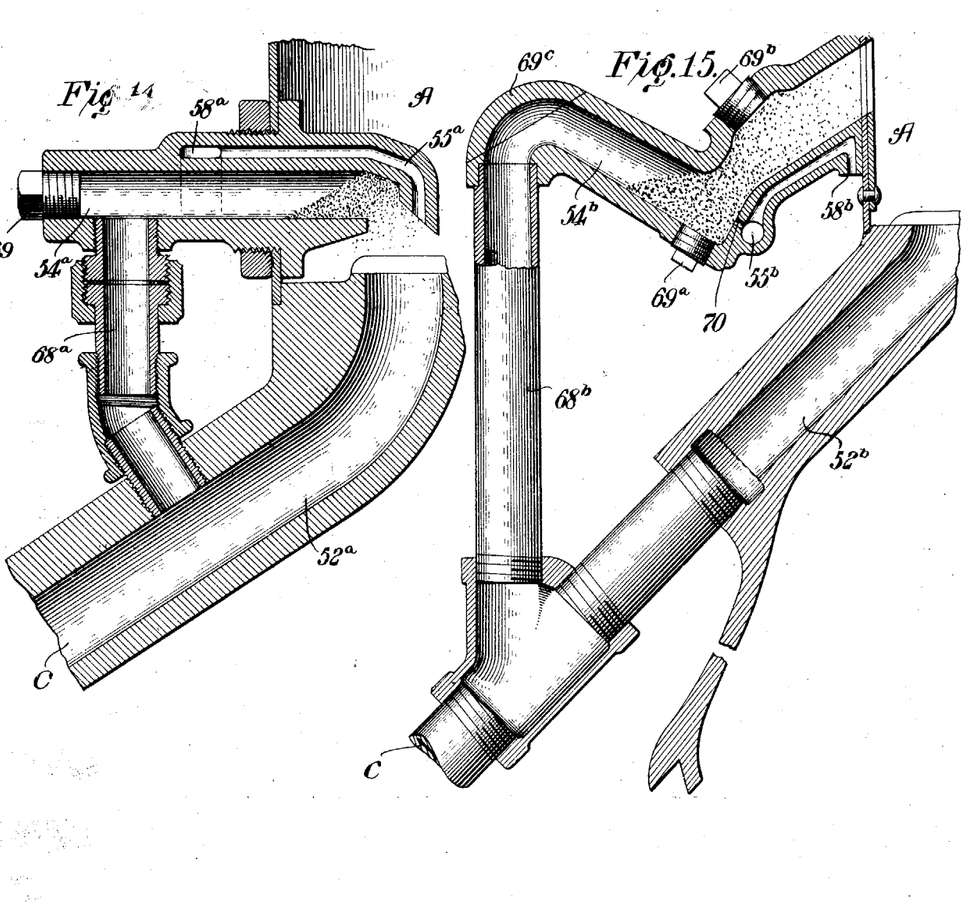

Referring to the modification illustrated in Figure 14 A is the sand dome, 54ᵃ a chamber for restraining the flow of the sand, 55ᵃ a passage connecting the said dome A with the atmosphere by means of a vent leading from the leg 58ᵃ of said passage. 68ᵃ is a connection between the chamber 54ᵃ and the passage 52ᵃ leading to the pipe C. 69 is a removable plug whereby the chamber 54ᵃ may be cleaned.

Referring to the modification illustrated in Figure 15 A is the sand dome, 54ᵇ a chamber for restraining the flow of the sand, 55ᵇ a passage connecting the said chamber 54ᵇ with the atmosphere by means of the ports 70 and 58ᵇ. 68ᵇ is a connection between the chamber 54ᵇ and the passage 52ᵇ leading to the pipe C. 69ᵃ, 69ᵇ and 69ᶜ are removable plugs whereby the chamber 54ᵇ and the passage 68ᵇ may be respectively cleaned.

Figure 16:
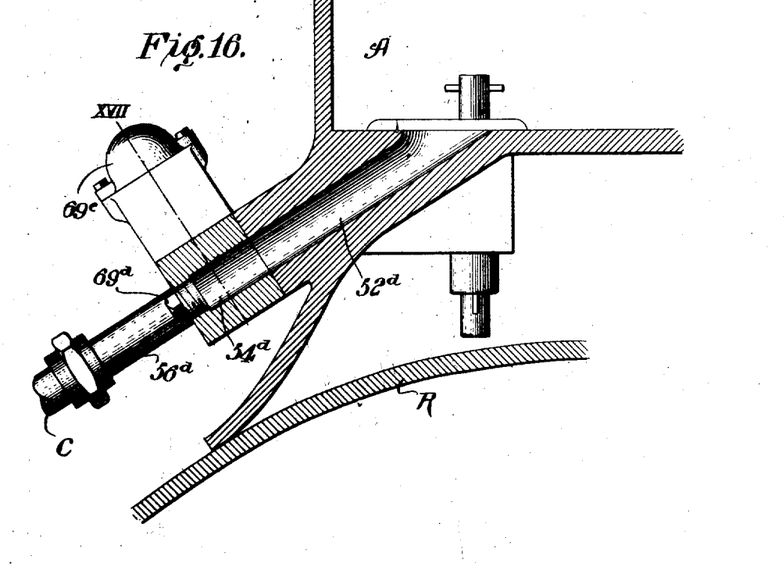
Figure 17:
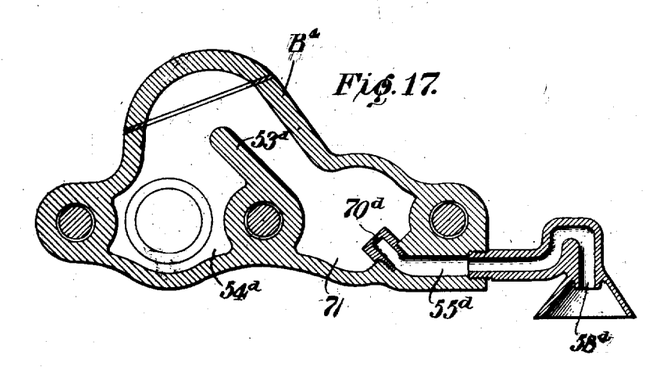
Figure 18:
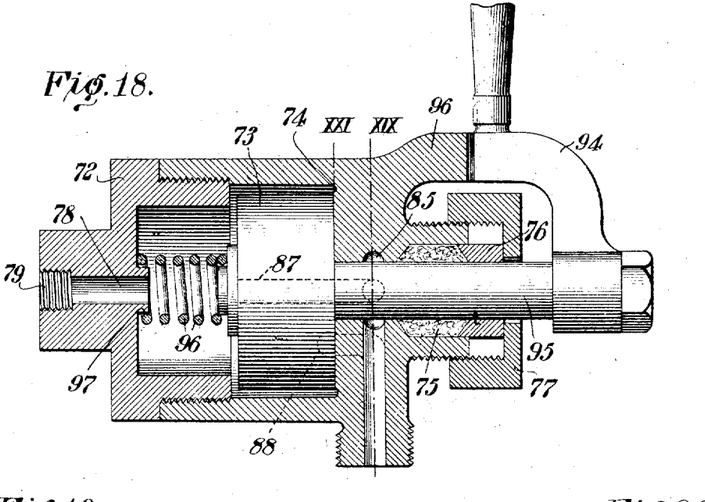
Figure 18 illustrates a modified form of controlling valve.
Figure 19:
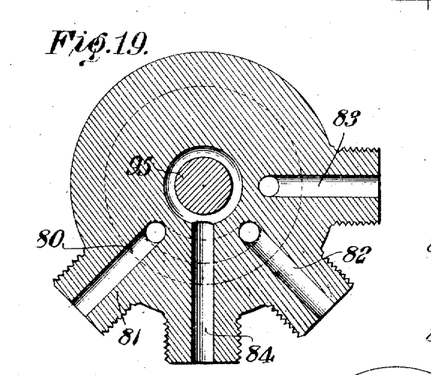
Figures 19 and 20 are details of the modification valve on the lines XIX to show the registry of the ports.

Referring to Figures 16 and 17 a further modification is shown wherein A is the sand dome, 52ᵈ a passage leading to the trap Bᵈ for restraining the flow of the sand, 53ᵈ is an abutment to prevent the sand from flowing from the chamber 71ᵈ to the chamber 54ᵈ, 56ᵈ is a passage connecting the chamber 54ᵈ with the pipe C and 55ᵈ is a passage connecting the chamber 71 with the atmosphere by means of the ports 70ᵈ and 58ᵈ, the port 58ᵈ having a bell shaped terminal to prevent the entrance of water into the passage 55ᵈ. 69ᵈ and 69ᵉ are removable plugs whereby the chambers 54ᵈ and 71 may be cleaned.

Referring to Figures 18, 19, 20 and 21 I here illustrate a modification of the form of controlling valve F (Figure 1) wherein 72 is a casing having a rotary valve 73 adapted to seat at 74 and provided with packing 75 held in place by the gland 76 upon which is mounted the cap 77 screw threaded onto the said casing, the valve being pressed against the seat by means of steam pressure and the spring 96 which abuts against a boss 97 in the bottom of the casing and is held in place thereby. The casing 72 is provided with a passage 78 leading to a connection 79 with the steam line E, a passage 80 leading to a connection 81 to the main reservoir pipe H, a passage 82 leading to a connection to the auxiliary reservoir pipe K, a passage 83 leading to the ejector pipe L, and a leakage vent to the atmosphere (84) surrounding the valve stem 95 by a passage 85. The valve 73 is provided with a grooved by-pass 88 registering with the passages 80 and 82, and with a passage 87 registering with the passages 79 and 83 when the valve is open as shown by the position of the handle 94 in Figure 18. The by-pass consisting of the groove 88 registers respectively with the passages 82 and 83 when the valve is in its closed position. The valve 73 is further provided with a stem 95 having a handle 94 for rotation of the valve within the limits of a pair of stops (one not shown) 96 on the casing 72 formed by cutting away the top of said casing, as shown in Figure 3.

The operation of the apparatus is as follows, viz: The handle 45 of the valve F (Figure 1) is moved to the position shown in Figure 2, and communication is thereby established between the steam dome D and the ejector M, by means of the pipes E and L and the registering ports and passages in the valve F, and communication is likewise established between the main reservoir G and the auxiliary reservoir J by means of the pipes H and K and the registering ports and passages, all as above described in connection with Figures 2, 3, 4 and 5. This action permits the flow of air from the main reservoir G to the auxiliary reservoir J until such time as their pressures shall have become equalized at approximately seventy-five pounds. At the same time steam at substantially thrice the pressure is expelled from the dome D out through the circumferential passage 64 and the ejector 66 which causes a partial vacuum in the pipe C and the chamber 54, assuming the plug 57 to have been turned at right angles to the position shown in Figure 8. This vacuum causes an inrush of air through the port 58 and passage 55, the effect of which is to carry the sand that has descended from the dome A into the trap B over the abutment 53 and thence downward through the chamber 54 the pipe C and the ejector 66 out to the atmosphere and to apply such sand to the point of contact between the wheel O and the rail (not shown). When sufficient sand has been applied, the valve handle 45 is moved and communication between the steam dome D and the ejector M; and between the main reservoir G and the auxiliary reservoir J interrupted by the movement of the plug 23 whereby the ports and passages 43, 37 and 28, and 38ª, 38 and 30 are blanked as shown in dotted lines in Figures 4 and 5. Communication is then established between the auxiliary reservoir J and the ejector M by means of the pipes K and L and the registering ports and passages, as above described in connection with Figures 2, 3, 4 and 5. The compressed air accumulated in the auxiliary reservoir J will now flow from such reservoir through the circumferential passage 64 and the ejector 66 and remove any remains of steam, vapor or water, that may have accumulated in the pipe L or the ejector M from the passage of the steam or the condensation thereof. It will be noted that the groove 64 and the chamber 63 and the vent 67 provide a further drainage for any moisture that may accumulate in the pipes or in the ejector.

In Figures 14, 15, 16 and 17 wherein I have illustrated modifications of the sand trap B forming part of my invention, steam passes from the dome D out through the ejector M in all cases and the operation of all other parts, save the sand trap B, is identical with that of my invention as above described in connection with its preferred form. The operation of the modified sand-traps is as follows, viz:

Referring to Figure 14 the vacuum in the pipe C, passage 68ª and chamber 54ª tends to draw the sand from the dome A through chamber 54ª passage 68ª into the pipe C which action is accelerated and maintained constant by the consequent inrush of air from the atmosphere through the port 58ª and the passage 55ª into the sand accumulated in the chamber 54ᵇ, through the said chamber 54ª communicating with the sand dome A. Referring to Figure 15 the vacuum in the pipe C passage 68ᵇ and the chamber 54ᵇ, tends to draw the sand accumulated in the chamber 54ᵇ, through the said chamber and the passage 68ᵇ into the pipe C, which action is accelerated and maintained constant by the consequent inrush of air through the port 58ᵇ and the passage 55ᵇ and port 70ᵇ.

Referring to Figures 16 and 17 the vacuum in the pipe C passage 56ᵈ and chamber 54, tends to cause the sand descended from the sand dome A into the chamber 71 to pass over the abutment 53ᵈ into the chamber 54 and thence into the pipe C, the passage being accelerated and maintained constant by the consequent inrush of air through the port 58ᵈ, passage 55ᵈ and port 70ᵈ.

Referring to Figures 18, 19, 20 and 21 wherein I have illustrated a modified form of the controlling valve F forming part of my invention, the operation of all other parts is identical with that of my invention as before described in its preferred form and that of this modification is as follows, viz: The handle 94 of the valve is moved to the position shown in Figure 18, and communication is established between the steam dome D and the ejector M by means of the pipes E and L and the registering ports and passages in the casing 72 and valve 73, and communication is likewise established between the main reservoir G and the auxiliary reservoir J by means of the pipes H and K and the registering ports and passages in the casing and valve, all as above described in connection with Figures 18, 19, 20 and 21.

Figure 20:
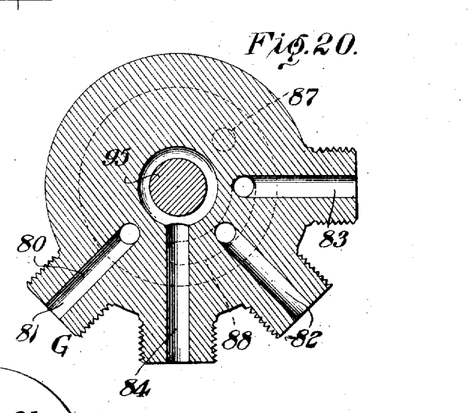
Figure 21:
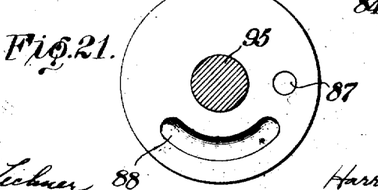
Figure 21 is a section on the line XXI of Figure 18 to show the steam port through the piston, and the superficial by-pass or port arranged on the face of the piston.

When sufficient sand has been applied the valve handle 94 is moved to bring the valve into the position shown in Figure 20, whereupon the present lines of communication are interrupted whereby the port 87 and connection 81 are blanked. Communication is then established between the auxiliary reservoir J and the ejector M, by means of the pipes K and L and communicating ports and passages as above described in connection with Figures 18, 19, 20 and 21.

From the above description, it will be apparent that I have by my present invention provided a sanding device of the character described, in which steam from the engine boiler will efficiently expel sand from the ejector without the aid of compressed air, and one wherein compressed air is used merely for the purpose of blowing out from the system any vestiges of steam, vapor, or moisture that may remain therein; that I have further provided a sand-trap that may be manually controlled as a gravity device, or will retain the sand until that material is subjected to the action of a vacuum or fluid pressure and thereupon allow it to be freely movable; that I have further provided improved valve devices wherein the passages which establish communication between the steam pressure and the atmosphere, and between the air pressures are so arranged that the two sources of pressure are kept separate and distinct as desired and without danger of leakage of moisture into the air pressure system, but are closed off positively to retain each pressure within its own reservoir and piping, until desired and that such closure is effected by means not liable to derangement from either dirt, or other foreign matter or the action of steam because of the employment of the by-pass or steam stop grooves with leakage vents to the atmosphere, and of the employment of valve plug or rotary valve which is subject to movement only by hand or manually controlled mechanism and is open to none of the objections to devices controlled indirectly or by springs or fluid pressure; wherein the ejector proper is so arranged that vapor, moisture or water may not collect therein and cause consequent packing or stoppage of damp sand, or freezing of the parts in cold weather.

It is obvious that if desired air might be taken directly from the main reservoir without interposition of the auxiliary reservoir, that other forms of sand traps, ejectors, or devices for controlling the expulsion, firstly of steam, and, secondly of air, might be substituted in the arrangement of parts shown without departure from the spirit of my invention which contemplates broadly the provision of a device of the character described wherein steam is used for the main or initial expulsion of the material and air to supplement or complete the operation.

While I have shown my inventions as arranged for a sanding device it is obvious that they are capable of efficient application in a wide field of usefulness, and such applications are within the scope of my inventions and intended to be covered by my claims.

Having thus described my invention and illustrated its use, what I claim as new and desire to secure by Letters Patent, is the following:—

1. A device of the character described comprising a receptacle for material, a steam reservoir, a main air reservoir, an auxiliary air reservoir, an ejector pipe, and connections and controlling means therefor whereby air may be supplied to the auxiliary reservoir from the main reservoir and whereby steam from the steam reservoir and air from the auxiliary reservoir may be supplied to the ejector.

2. In an apparatus of the character described, a sand dome, a trap connected thereto, an ejector connected to said trap, a steam reservoir, an air reservoir, a controlling valve, connections between said valve and said steam reservoir and air reservoirs.

3. In an apparatus of the character described, a sand dome, a trap connected thereto, an ejector connected to said trap, a steam reservoir, a main air reservoir, an auxiliary air reservoir, a controlling valve, connections between said valve and said steam reservoir and air reservoirs.

4. In an apparatus of the character described, a sand dome, a trap connected thereto, an ejector connected to said trap, a steam dome, an air reservoir, a controlling valve, connections between said valve and said steam dome and air reservoirs, and ports and passages in said valve, whereby communication may be established in turn between said steam dome and said ejector, and thereafter between said air reservoir and said ejector.

5. In an apparatus of the character described, a sand dome, a trap connected thereto, an ejector connected to said trap, a steam dome, a main air reservoir, an auxiliary air reservoir, a controlling valve, connections between said valve and said steam dome and air reservoirs, and ports and passages in said valve whereby communication may be established in turn between said steam dome and said ejector; and between said air reservoirs, and thereafter between an air reservoir and said ejector.

6. A valve device comprising a casing, a valve member, connections from the casing to a steam and a plurality of air reservoirs, and to an ejector pipe, passages in said valve member adapted to register with said steam, air and ejector connections, and means for operating said valve device, whereby said connections and passages may be brought into register.

7. A valve device comprising a casing, a valve member, connections from the casing to a steam and air reservoirs and to an ejector pipe and to the atmosphere, passages in said valve member registering with said atmosphere connection and adapted to register with said steam, air and ejector connections, and means for operating said valve device whereby said connections and passages may be brought into register.

8. A valve device comprising a casing, a valve member, connections from the casing to a steam and a plurality of air reservoirs, and to an ejector pipe and to the atmosphere passages in said valve member registering with said atmosphere connection and adapted to register with said steam, air and ejector connections, and means for operating said valve device whereby said connections and passages may be brought into register.

9. A valve device comprising a casing, a valve member, connections from the casing to steam and air reservoirs, and to an ejector pipe, passages in said valve member adapted to register with said steam, air and ejector connections, and means for operating said valve device whereby said connections and passages may be brought into register.

10. A controlling device for sanders comprising a casing having connections from a steam and a plurality of air reservoirs and to an ejector pipe, and a valve member in said casing having a passage for establishing communication between said steam reservoir and ejector pipe, a passage for establishing communication between said air reservoirs, and a passage for establishing communication between an air reservoir and said ejector pipe, the said passages being so arranged that when the valve member is in one position steam will pass from the steam reservoir to the ejector pipe and air will pass from one of the air reservoirs to another thereof, and when the said valve is in another position air will pass from the second air reservoir to the ejector pipe.

11. A controlling device for sanders comprising a casing having connections from steam and air reservoirs and to an ejector pipe, and a valve member in said casing having a passage for establishing communication between said steam reservoir and ejector pipe, and a passage for establishing communication between said air reservoir and said ejector pipe, the said passages being so arranged that when the valve member is in one position steam will pass from the steam reservoir to the ejector pipe, and when said valve is in another position air will pass from the air reservoir to the ejector pipe.

12. A controlling device for sanders comprising a casing having connections from a steam and a plurality of air reservoirs and to an ejector pipe, and a valve member in said casing having a passage for establishing communication between said steam reservoir and ejector pipe, a passage for establishing communication between said air reservoirs, and a passage for establishing communication between an air reservoir and said ejector pipe.

13. A controlling device for sanders comprising a casing having connections from steam and air reservoirs to an ejector pipe, and a valve member in said casing having a passage for establishing communication between said steam reservoir and ejector pipe, and a passage for establishing communication between said air reservoir and said ejector pipe.

14. The combination with a sand receptacle, of a trap therebeneath, an inlet pipe from the receptacle to the trap and an outlet pipe from the trap provided with exhaust means, the trap being provided with an inlet from the atmosphere located so as to be covered by the sand discharged to the trap, said inlet being arranged so as to prevent the discharge of sand therethrough by gravity.

15. A trap comprising a body having connections to a receptacle for material and a discharge pipe provided with exhaust means, means for retarding the flow of the material through the trap, and an inlet from the atmosphere in position to be covered by the retarded material, said inlet being arranged so as to prevent the discharge of material therethrough by gravity.

16. A trap comprising a body having connections to a receptacle for material and a discharge pipe provided with exhaust means, an abutment for restraining the flow of the material, and an inlet from the atmosphere with its lower end located beneath the retarded material, said inlet being arranged so as to prevent the discharge of material therethrough by gravity.

17. A trap comprising a body having connections to a receptacle for material and a discharge pipe, a pair of passages through the trap, retarding means for checking the flow of material through one passage, a valve operable from the exterior of the trap for controlling the flow through the other passage, and an inlet from the atmosphere adjacent the first passage.

18. An ejector comprising supply and outlet pipes in substantial alinement, forwardly directed circumferential fluid inlet means leading into the periphery of the passage through the pipes and means for supplying fluid pressure to the inlet means.

19. An ejector comprising a casing provided with a substantially straight passage, and forwardly directed fluid inlet means arranged circumferentially and leading into the periphery of the passage, and means for supplying fluid pressure to such inlet passage.

20. An ejector comprising a casing provided with a substantially straight passage, and a forwardly directed annular inlet passage surrounding the first passage and leading into the periphery thereof, and means for supplying fluid pressure to such inlet passage.

21. The combination with a locomotive having an air compressor and main air reservoir, of an auxiliary air reservoir, a sander and a controlling valve having connections to the boiler, the reservoirs and the sander and adapted in one position to admit steam to the sander and place the reservoirs in communication and in another position to cut off the steam, cut off communication between the two reservoirs, and supply air from the auxiliary reservoir to the sander.

22. The method of sanding a railroad track which consists in feeding the sand through an ejector by steam, and thereafter after the elapse of an approximately short period sending a stream of compressed air through the ejector to remove moisture from the ejector.

23. The method of ejecting powder which consists in establishing a vacuum in an ejector by blowing steam therethrough and causing the powder to pass from said ejector, and immediately thereafter blowing air through the ejector to remove moisture from the ejector.

In testimony whereof I have hereunto signed by name in the presence of two subscribing witnesses.

HARRY VISSERING.

Witnesses:
PAUL CARPENTER,
G. W. CUNNINGHAM.

---

Correction in Letters Patent No. 943,288.

It is hereby certified that in Letters Patent No. 943,288, granted December 14, 1909, upon the application of Harry Vissering, of Chicago, Illinois, for an improvement in "Track-Sanders," an error appears in the printed specification requiring correction, as follows: Page 1, line 58, the word "throwing" should read *thawing;* and that the said Letters Patent should be read with this correction therein that the same may conform to the record of the case in the Patent Office.

Signed and sealed this 25th day of January, A. D., 1910.

[SEAL.]

C. C. BILLINGS,
*Acting Commissioner of Patents.* outlet pipes in substantial alinement, forwardly directed circumferential fluid inlet means leading into the periphery of the passage through the pipes and means for supplying fluid pressure to the inlet means.

19. An ejector comprising a casing provided with a substantially straight passage, and forwardly directed fluid inlet means arranged circumferentially and leading into the periphery of the passage, and means for supplying fluid pressure to such inlet passage.

20. An ejector comprising a casing provided with a substantially straight passage, and a forwardly directed annular inlet passage surrounding the first passage and leading into the periphery thereof, and means for supplying fluid pressure to such inlet passage.

21. The combination with a locomotive having an air compressor and main air reservoir, of an auxiliary air reservoir, a sander and a controlling valve having connections to the boiler, the reservoirs and the sander and adapted in one position to admit steam to the sander and place the reservoirs in communication and in another position to cut off the steam, cut off communication between the two reservoirs, and supply air from the auxiliary reservoir to the sander.

22. The method of sanding a railroad track which consists in feeding the sand through an ejector by steam, and thereafter after the elapse of an approximately short period sending a stream of compressed air through the ejector to remove moisture from the ejector.

23. The method of ejecting powder which consists in establishing a vacuum in an ejector by blowing steam therethrough and causing the powder to pass from said ejector, and immediately thereafter blowing air through the ejector to remove moisture from the ejector.

In testimony whereof I have hereunto signed by name in the presence of two subscribing witnesses.

HARRY VISSERING.

Witnesses:
PAUL CARPENTER,
G. W. CUNNINGHAM.

---

Correction in Letters Patent No. 943,288.

It is hereby certified that in Letters Patent No. 943,288, granted December 14, 1909, upon the application of Harry Vissering, of Chicago, Illinois, for an improvement in "Track-Sanders," an error appears in the printed specification requiring correction, as follows: Page 1, line 58, the word "throwing" should read *thawing;* and that the said Letters Patent should be read with this correction therein that the same may conform to the record of the case in the Patent Office.

Signed and sealed this 25th day of January, A. D., 1910.

[SEAL.]

C. C. BILLINGS,

*Acting Commissioner of Patents.*

Correction in Letters Patent No. 943,288.

It is hereby certified that in Letters Patent No. 943,288, granted December 14, 1909, upon the application of Harry Vissering, of Chicago, Illinois, for an improvement in "Track-Sanders," an error appears in the printed specification requiring correction, as follows: Page 1, line 58, the word "throwing" should read *thawing*; and that the said Letters Patent should be read with this correction therein that the same may conform to the record of the case in the Patent Office.

Signed and sealed this 25th day of January, A. D., 1910.

[SEAL.]

C. C. BILLINGS,

*Acting Commissioner of Patents.*